United States Patent
Testardi et al.

(10) Patent No.: US 10,999,397 B2
(45) Date of Patent: May 4, 2021

(54) CLUSTERED COHERENT CLOUD READ CACHE WITHOUT COHERENCY MESSAGING

(71) Applicant: Microsoft Technology Licensing, LLC, Redmond, WA (US)

(72) Inventors: Richard Paul Testardi, Boulder, CO (US); Cameron Michael Hall, San Jose, CA (US); Suhas Prakash, San Jose, CA (US); Ernie Pistor, Brookline, NH (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/519,120

(22) Filed: Jul. 23, 2019

(65) Prior Publication Data
US 2021/0029213 A1    Jan. 28, 2021

(51) Int. Cl.
*H04L 29/08* (2006.01)
*G06F 16/172* (2019.01)
*G06F 12/0802* (2016.01)

(52) U.S. Cl.
CPC ........ *H04L 67/2852* (2013.01); *G06F 16/172* (2019.01); *H04L 67/1097* (2013.01); *G06F 12/0802* (2013.01)

(58) Field of Classification Search
CPC .. G06F 3/067; G06F 11/1464; G06F 12/0802; G06F 16/172; G06F 16/182; H04L 67/1097; H04L 67/2852
See application file for complete search history.

(56) References Cited

U.S. PATENT DOCUMENTS

| 9,298,624 | B2 | 3/2016 | Ren et al. |
| 9,432,457 | B2 | 8/2016 | Marano et al. |
| 9,727,470 | B1 | 8/2017 | Cande et al. |
| 9,928,174 | B1 * | 3/2018 | Connell .............. G06F 12/0815 |

(Continued)

FOREIGN PATENT DOCUMENTS

WO    0237225 A2    5/2002

OTHER PUBLICATIONS

"Stub Files", Retrieved From: https://www.ibm.com/support/knowledgecenter/en/SSATMW_7.1.3/hsmwin/c_ovw_stub.html, Retrieved Date: Jun. 24, 2019, 3 Pages.

(Continued)

*Primary Examiner* — Jeong S Park
(74) *Attorney, Agent, or Firm* — Rainier Patents, P.S.

(57) ABSTRACT

Described herein is a system and method for performing a clustered coherent cloud read cache without coherency messaging. At a cloud reader agent having a read cache, a request for a particular portion of data is received from a client. The request includes an identifier of the node making the request, a current time on the node making the request, a last stubbed time of the particular portion of data, and/or an identifier of the particular portion of data. When the particular portion of data is stored in the read cache of the cloud reader agent, the cloud reader agent can determine whether the cached particular portion of data is valid based, at least in part, upon the received identifier of the node making the request, the received last stubbed time of the particular portion of data, and/or, a stored time associated with the cached particular portion of data.

20 Claims, 9 Drawing Sheets

(56) References Cited

U.S. PATENT DOCUMENTS

| | | | |
|---|---|---|---|
| 10,097,659 B1* | 10/2018 | Rao | G06F 11/1464 |
| 10,445,289 B1* | 10/2019 | Faibish | G06F 16/185 |
| 2007/0101284 A1* | 5/2007 | Shaw | G06Q 10/107 |
| | | | 715/772 |
| 2011/0246416 A1* | 10/2011 | Prahlad | G06F 16/1734 |
| | | | 707/610 |
| 2012/0084524 A1* | 4/2012 | Gokhale | G06F 11/1451 |
| | | | 711/162 |
| 2012/0254555 A1 | 10/2012 | Miwa et al. | |
| 2013/0024421 A1 | 1/2013 | Shinohara | |
| 2013/0144736 A1 | 6/2013 | Vodopia | |
| 2015/0100663 A1* | 4/2015 | Sugimoto | H04L 67/1097 |
| | | | 709/213 |
| 2015/0373116 A1* | 12/2015 | Mo | G06F 3/0647 |
| | | | 709/219 |
| 2016/0224433 A1 | 8/2016 | Testardi | |
| 2018/0032249 A1 | 2/2018 | Makhervaks et al. | |
| 2018/0307702 A1 | 10/2018 | Kube | |
| 2019/0073378 A1 | 3/2019 | Guturi et al. | |
| 2020/0278931 A1* | 9/2020 | Bavishi | G06F 12/0882 |

OTHER PUBLICATIONS

"Application as Filed in U.S. Appl. No. 15/872,453", filed Jan. 16, 2018, 75 Pages.

Bessani, et al., "SCFS: A Shared Cloud-backed File System", In Proceedings of USENIX Annual Technical Conference, Jun. 19, 2014, pp. 169-180.

Hall Christine, "Microsoft's Box for Shipping Lots of Data Into the Cloud Now in GA", Retrieved From: https://www.datacenterknowledge.com/microsoft/microsofts-box-shipping-lots-data-cloud-now-ga, Sep. 26, 2018, 9 Pages.

Vrable, et al., "BlueSky: A Cloud-Backed File System for the Enterprise", In Proceedings of the 10th USENIX conference on File and Storage Technologies, Feb. 14, 2012, 14 Pages.

"International Search Report and Written Opinion Issued in PCT Application No. PCT/US20/036720", dated Sep. 23, 2020, 13 Pages.

* cited by examiner

FIG. 1

| TIME INTERVAL | FILE SYSTEM | CLOUD | READ CACHE |
|---|---|---|---|
| INIT. | NULL | NULL | NULL |
| T0 | V1 | V1 | NULL |
| T1 | [STUBBED AT T1] | V1 | NULL |
| T2 | [STUBBED AT T1] | V1 | NULL |
| T3 | [STUBBED AT T1] | V1 | V1 [N1, T2] |
| T4 | V2 | V2 | V1 [N1, T2] |
| T5 | [STUBBED AT T5] | V2 | V1 [N1, T2] |
| T6 | [STUBBED AT T5] | V2 | [DET. INVALID] |
| T7 | [STUBBED AT T5] | V2 | V2 [N1, T6] |

CLUSTERED COHERENT CLOUD READ CACHE WITHOUT COHERENCY MESSAGING

BACKGROUND

Traditional read caches, and especially clustered read caches, depend on coherency messaging to invalidate cache entry(ies) when the backing store is modified. Coherency messaging is typically across a process or a node, and in a large cluster, is typically across many nodes. Coherency messaging is also typically synchronous. This makes it quite expensive in terms of performance and complexity. Coherency messaging can be especially expensive in a clustered environment where it may have to traverse across nodes, and even across multiple nodes, holding off the update of the backing store while the synchronous messages are unacknowledged.

SUMMARY

Described herein is a read cache system, comprising: a computer comprising a processor and a memory having computer-executable instructions stored thereupon which, when executed by the processor, cause the computer to: at a cloud reader agent: receive a request for a particular portion of data from a client, the request comprising an identifier of a node of a plurality of nodes making the request, a current time on the node making the request, a last stubbed time of the particular portion of data, and an identifier of the particular portion of data; when the particular portion of data is stored in a cache of the cloud reader agent, determine whether the cached particular portion of data is valid based, at least in part, upon the received identifier of the node making the request, the received last stubbed time of the particular portion of data, and, a stored time associated with the cached particular portion of data; when it is determined that the cached particular portion of data is valid, provide the cached data in response to the request; when it is determined that the cached particular portion of data is not valid: request a current copy of the particular portion of data; receive the current copy of the particular portion of data; and, provide the received current copy of the particular portion of data in response to the request from the client.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Various technologies pertaining to a clustered coherent cloud read cache are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The subject disclosure supports various products and processes that perform, or are configured to perform, various actions regarding a clustered coherent cloud read cache. What follows are one or more exemplary systems and methods.

Aspects of the subject disclosure pertain to the technical problem of a clustered coherent cloud read cache without coherency messaging. The technical features associated with addressing this problem involve at a cloud reader agent: receive a request for a particular portion of data from a client, the request comprising an identifier of a node of a plurality of nodes making the request, a current time on the node making the request, a last stubbed time of the particular portion of data, and an identifier of the particular portion of data; when the particular portion of data is stored in a cache of the cloud reader agent, determine whether the cached particular portion of data is valid based, at least in part, upon the received identifier of the node making the request, the received last stubbed time of the particular portion of data, and, a stored time associated with the cached particular portion of data; when it is determined that the cached particular portion of data is valid, provide the cached data in response to the request; when it is determined that the cached particular portion of data is not valid: request a current copy of the particular portion of data; receive the current copy of the particular portion of data; and, provide the received current copy of the particular portion of data in response to the request from the client. Accordingly, aspects of these technical features exhibit technical effects of more efficiently and effectively, reading cached content, for example, reducing consumption of computer resource(s) and/or reducing consumption of bandwidth.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems, etc.) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

Conventionally, read cache(es) use synchronous coherency messaging to invalidate cache entry(ies) when a backing store is modified. In many instances, updating of the backing store is conditioned upon receipt of acknowledgement message(s) from other process(es) and/or node(s) having or potentially having cached entry(ies). Coherency messaging can thus be expensive in terms of performance and/or complexity.

Described herein is a system and method in which read cache coherency is performed without coherency messaging. Instead, a data request to read includes information (e.g., a node identifier, current time on the node, last ghost time, and/or a file/blob name) to allow to cloud reader agent having a read cache to determine whether a cached copy of the requested data is valid (e.g., not stale). In some embodiments, the cloud reader agent can perform this determination independent of any other cloud reader agent(s)/read cache (s), and, and without cache coherency messaging between the cloud reader agent(s) and/or the cloud writer component (e.g., cloud writer agent). When the cached copy of the requested data is valid, the cloud reader agent can provide the cached copy of the requested data. Otherwise, the cloud reader agent can request a current copy of the requested data from the cloud.

Figure 1:
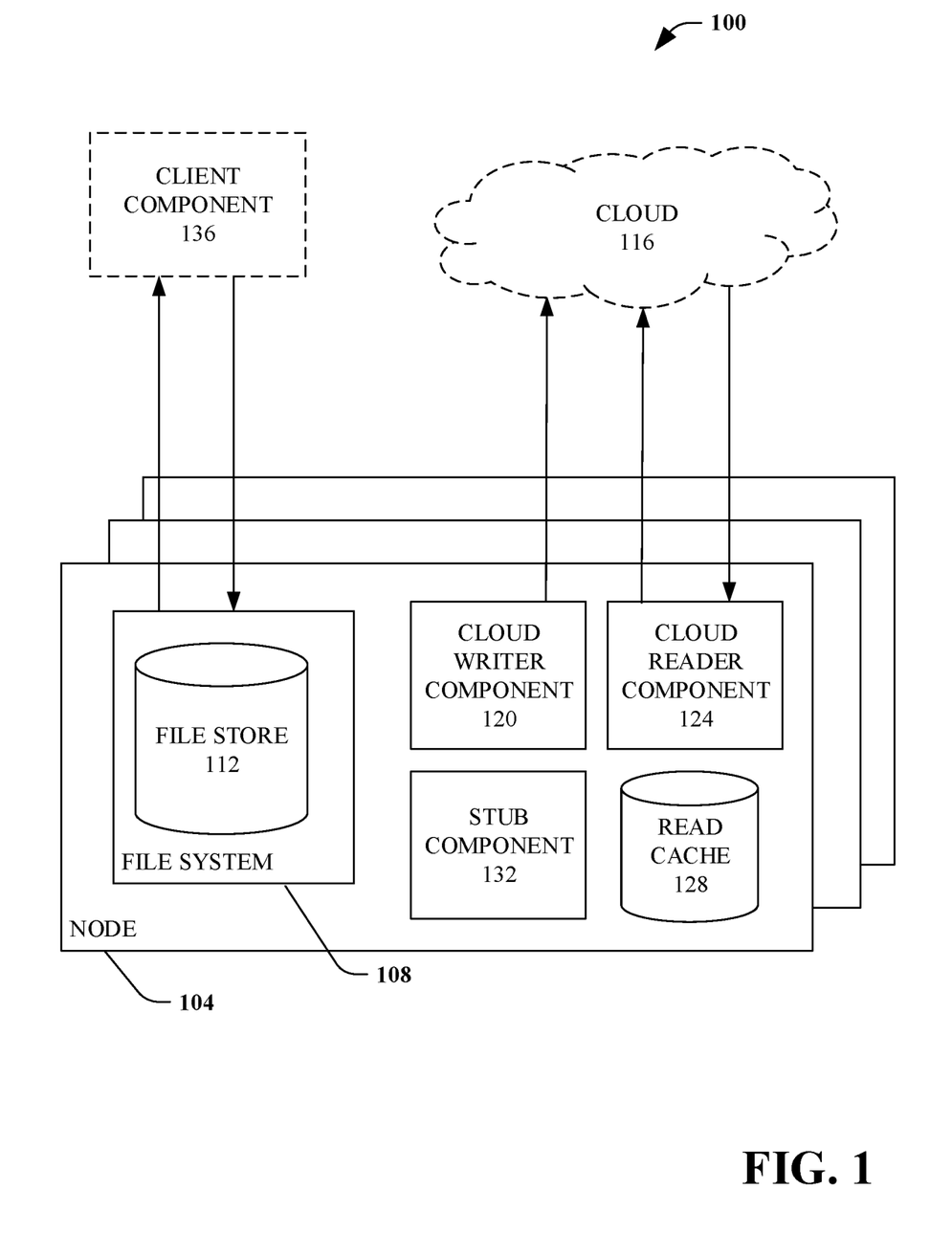
FIG. 1 is a functional block diagram that illustrates a read cache coherency system.

Referring to FIG. 1, a coherent read cache system 100 is illustrated. The system 100 includes one or more nodes 104, at least some of the nodes 104 having a file system 108 having a file store 112 (e.g., blob store), for example, based upon server message block (SMB) and/or network file system (NFS) protocol. The file store 112 can store files and/or information about files 112 (e.g., stubbed file(s)). A "stubbed file" refers to a reference to a file (or blob) for which the data of the file (or blob) is not currently stored locally on the file system 108, as discussed below.

The node 104 can include a cloud writer component 120 (e.g., cloud writer agent) that receives write information regarding particular file(s) or portion(s) of file(s) (e.g., about creation, modification, and/or deletion). The cloud writer component 120 can provide the write information to the cloud 116 which maintains a copy of some or all files of the file system 108.

The system 100 further includes one or more cloud reader components 124 (e.g., cloud reader agent(s)) at least some of which have a read cache 128. Each read cache 128 can store data read from the cloud 116 in response to read request(s) received and/or anticipated to be received by the file system 108. Data can be provided to the file system 108 from the read cache 128 significantly faster than data read from the cloud 116.

In some embodiments, the cloud reader component 124 can employ a caching strategy of storing the most recently received data in the read cache 128. In some embodiments, the cloud reader component 124 can employ a caching strategy of storing the most likely to be requested received data in the read cache 128.

The file system 108 further includes a stub component 132 that replaces a local copy of contents of a file with a reference to the contents of the file (e.g., a stub file), with the contents stored in the cloud 116. When replacing (removing) the local copy of the content of the file with the reference to the contents of the file, the stub component 136 can include temporal information regarding when the file was stubbed, for example, a time of when the file was stubbed. When reading a stubbed file from the files 112, the cloud reader component 124 can cause a copy of the stubbed file to be read (e.g., from the cloud 116 or from read cache 128), as discussed below.

In some embodiments, the time the file was stubbed is not stored persistently (e.g., on disk) like the rest of the file data, but is just stored in memory (e.g., in RAM). In a crash scenario, the read cache 128, which can also be stored in memory, can be lost along with the time the file was stubbed. In some embodiments, the system 100 can utilize a "last stubbed time" for every file of when the system 100 came back up, as opposed to when each file was actually last stubbed. By utilizing a "newer than actual" time of file stubbing, the worst case result is that the system 100 won't use cached data when it could have.

Conventionally, when read cache(s) are employed, before writing of a file, coherency messaging is utilized to invalidate cache entry(ies). In response to receipt of acknowledgment message(s) indicating that cache entry(ies) have been invalidated, the writing of the file can occur.

The system 100 does not employ coherency messaging to invalidate cache entry(ies). Instead, a data read request includes information (e.g., node identifier, current time on the node, last ghost time, and/or a file/blob name) to allow the cloud reader component 124 having a read cache 128 to determine whether a copy of the requested data stored in the read cache 128 is valid or not valid (e.g., stale). The cloud reader component 124 can perform this determination independent of any other cloud reader agent(s) 124 having read cache(s) 128 and/or the cloud writer component 120 (e.g., cloud writer agent). When cloud reader component 124 determines that the copy of the requested data stored in the read cache 128 is valid, the cloud reader component 124 can provide the cached copy of the requested data in response to the data read request. Otherwise, the copy of the requested data can be determined to be invalid, and, the cloud reader component 124 can request a current copy of the requested data from the cloud 116. In response to receipt of the requested data from the cloud 116, the cloud reader component 124 can provide the requested data received from the cloud 116 to the reader component 136. In some embodiments, the cloud reader component 124 can store the received requested data in the read cache 128.

Figure 2:
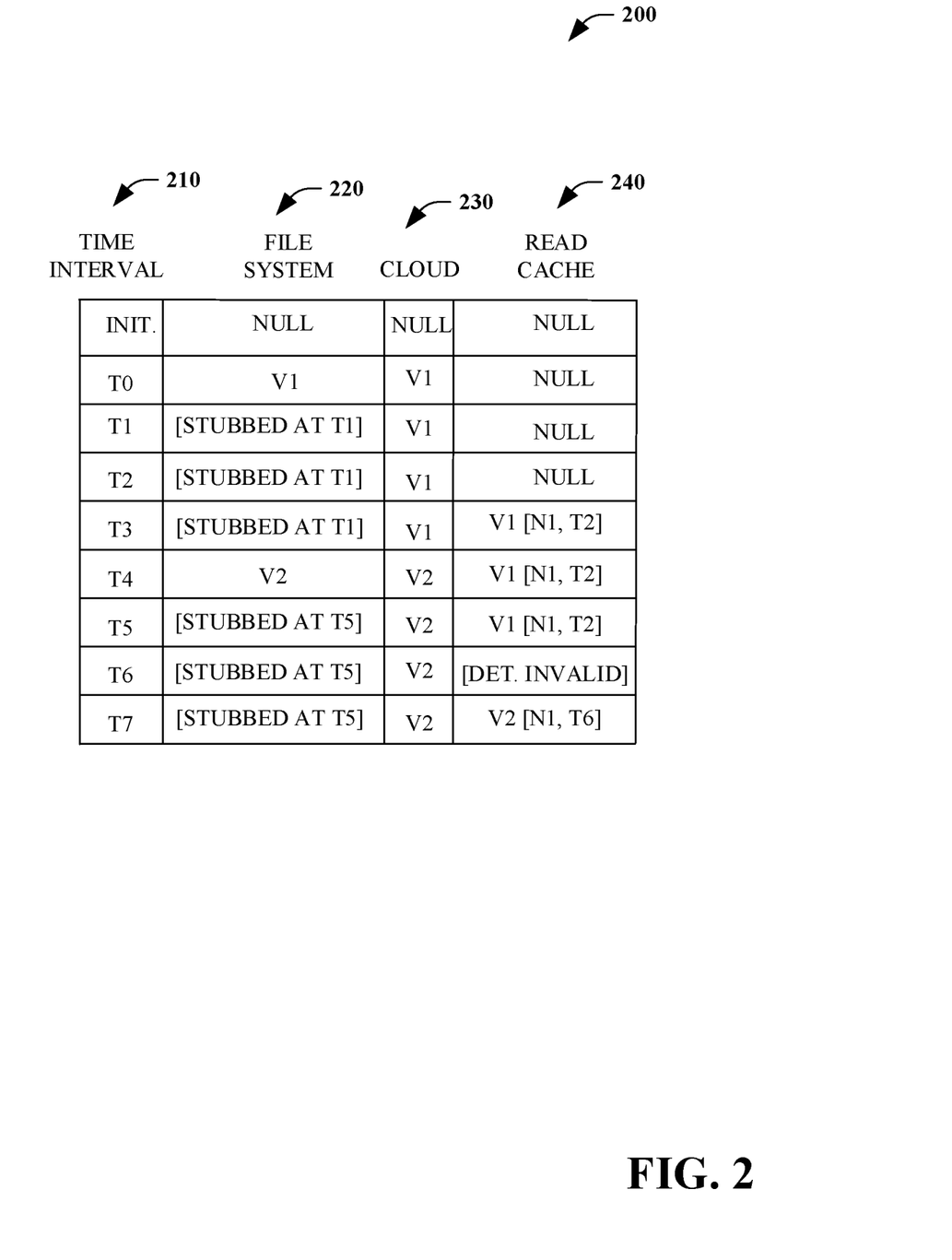
FIG. 2 is a diagram of exemplary contents of a file store, contents of a cloud, and, contents of a read cache at particular times.

For purposes of explanation and not limitation, a first scenario of writing and subsequently reading a first version of a file (or portion thereof) is described. FIG. 2 is a diagram 200 of a time interval 210, a content of the file store 220 (e.g., file store 112 of file system 108), a content of the cloud 230 (e.g., cloud 116), and, a content of read cache 240 (e.g., read cache 128).

First, a client component 136 provides a newly created file (V1) to the file system 108 of the node 104 (time T0). In some embodiments, the client component 136 executes on the node 104. In some embodiments, the client component 136 executes on a device physically separate from the node 104.

The file system 108 stores a copy of the newly created file (V1) in the file store 112. Thereafter, the cloud writer component 120 provides (e.g., stores) the newly created file (V1) in the cloud 116.

At some point in time after the newly created file (V1) has been stored in the cloud 116, the stub component 132 stubs the newly created file (V1). In doing so, the stub component 132 stores a reference to the newly created file (V1) in the file store 112 along with a time that the file was stubbed (T1).

Subsequently, the client device 136 requests to read V1 from the file system 108. Since V1 was stubbed, the file is not stored in the file store 112, and, the file system 108 requests to read the file (V1) using the cloud reader component 124. In addition to the name of the file, the file system 108 provides a node identifier of the node 104 (N1) upon which the file system 108 is executing, along with a last stubbed time (T1) stored in the file store 112 by the stub component 132, and, the current time (T2).

The cloud reader component 124 first checks its read cache 128 which does not have a cached copy of the file. Thereafter, the cloud reader component 124 requests and receives a copy of the file from the cloud 116. Subsequently, at time (T3), the cloud reader component 124 stores the file (V1) in read cache 128 along with the node identifier (N1) and/or the current time (T2) provided by the file system 108. The cloud reader component 124 further provides a copy of the file (V1) to the file system 108 which provides the copy of file (V1) to the client component 136.

Thereafter, the client component 136 makes changes to the file resulting in (V2) of the file. t time T4, the client component 136 provides the changed file (V2) to the file system 108 which stores the file (V2) in the file store 112. Thereafter, the cloud writer component 120 provides (e.g., stores) the changed file (V2) in the cloud 116.

At some point in time after the changed file (V2) has been stored in the cloud 116, the stub component 132 stubs the changed file (V2). In doing so, the stub component 132 stores a reference to the changed file (V2) in the file store 112 along with the time that the file was stubbed (T5).

Subsequently, the client device 136 requests to read V2 from the file system 108. Since the file (V2) was stubbed, the file is not stored in the file store 112, and, the file system 108 requests to read the file (V2) using the cloud reader component 124. In addition to the name of the file, the file system 108 provides a node identifier of the node 104 (N1) upon which the file system 108 is executing, along with a last stubbed time (T5) stored in the file store 112 by the stub component 132, and, the current time (T6).

The cloud reader component 124 first checks its read cache 128 and determines that a copy of the file is stored in the read cache 128. The cached copy of the file (V1) includes a node identifier (N1) and/or a stored current time (T2). Based, at least in part, upon determining that the stored current time (T2) is before (e.g., less than) the last stubbed time (T5), the cloud reader component 124 can determine that the cached copy of the file (V1) is not valid (e.g., stale).

Thereafter, the cloud reader component 124 requests and receives a copy of the file (V2) from the cloud 116. At time (T7), the cloud reader component 124 stores the file (V2) in read cache 128 along with the current time (T6) provided by the file system 108 (e.g., of the client read). The cloud reader component 124 further provides a copy of the file (V2) to the file system 108 which provides the copy of file (V2) to client component 136.

In some embodiments, a node 104 includes a file system 108, a cloud writer component 120, a stub component 132, and/or a cloud reader component 124. In some embodiments, each of a plurality of nodes 104 includes a file system 108, a cloud writer component 120, a stub component 132, and a cloud reader component 124. In some embodiments, a hardware appliance includes a plurality of nodes 104 (e.g., a clustered appliance).

In some embodiments, the node identifier is not provided by the file system 108 and/or stored by the cloud read component 124. For example, the node identifier would be superfluous in a single node scenario. Additionally, clock drift between nodes of a cluster of nodes can be compensated for using a clock skew threshold, as discussed below. In some embodiments, the algorithm described above can be utilized to read a range of files (e.g., described by offset, length) and/or subset(s) of data.

For purposes of explanation and not limitation, the system and method have been described herein regarding a file system 108, a file store 112, and a file. In some embodiments, the system and method described herein can be used with portions of data (e.g., chunks and/or blobs) and/or information regarding portions of data (e.g., stubs regarding chunks and/or blobs) stored in the file system 108 and the file store 112.

FIGS. 3-8 illustrate exemplary methodologies relating to a clustered coherent cloud read cache without coherency messaging. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Figure 3:
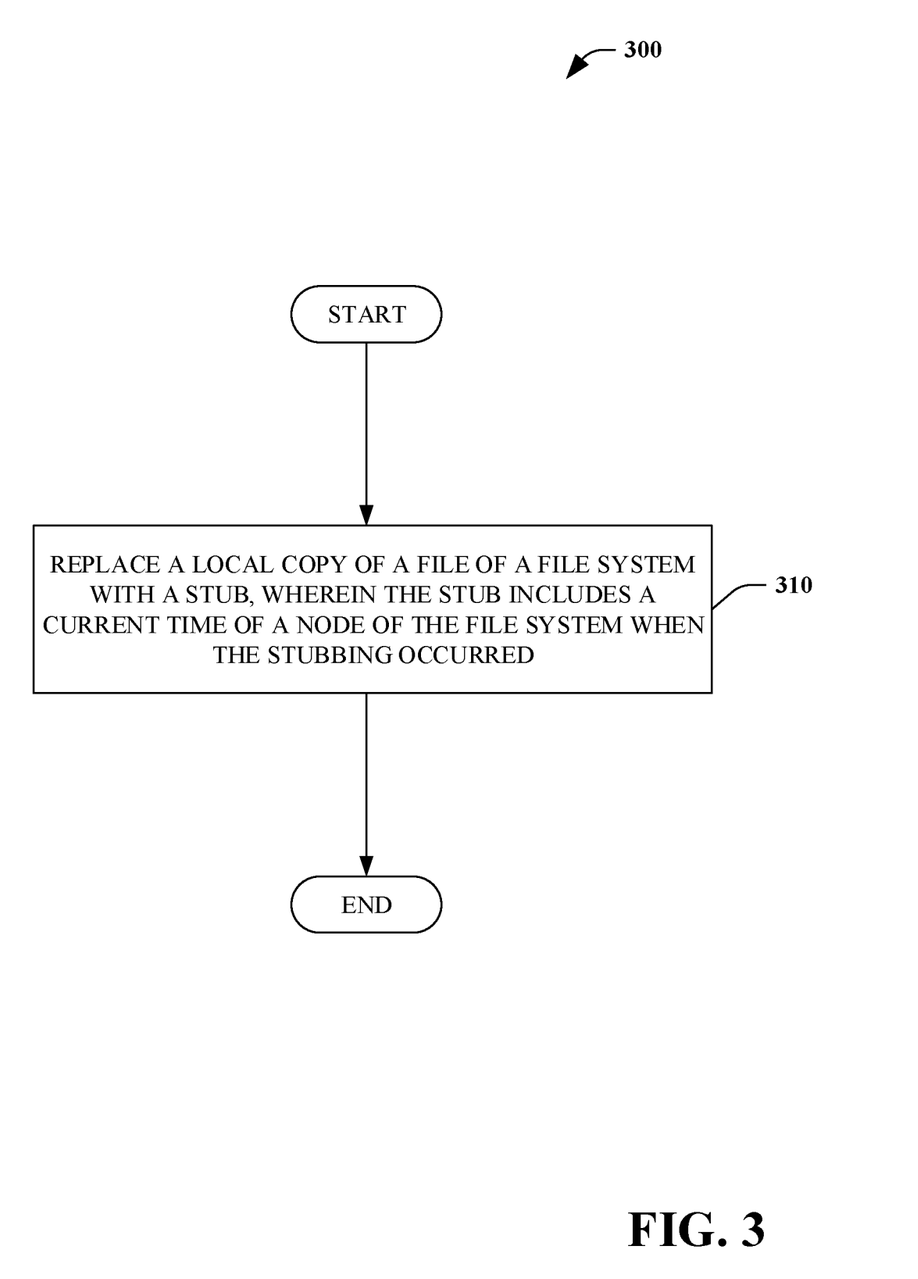
FIG. 3 is a flow chart of a method of stubbing files.

Referring to FIG. 3, a method of stubbing files 300 is illustrated. In some embodiments, the method 300 is performed by the stub component 132.

At 310, a local copy of a file of a file system is replaced with a stub. The stub includes a current time of a node of the file system when the stubbing occurred.

Figure 4:
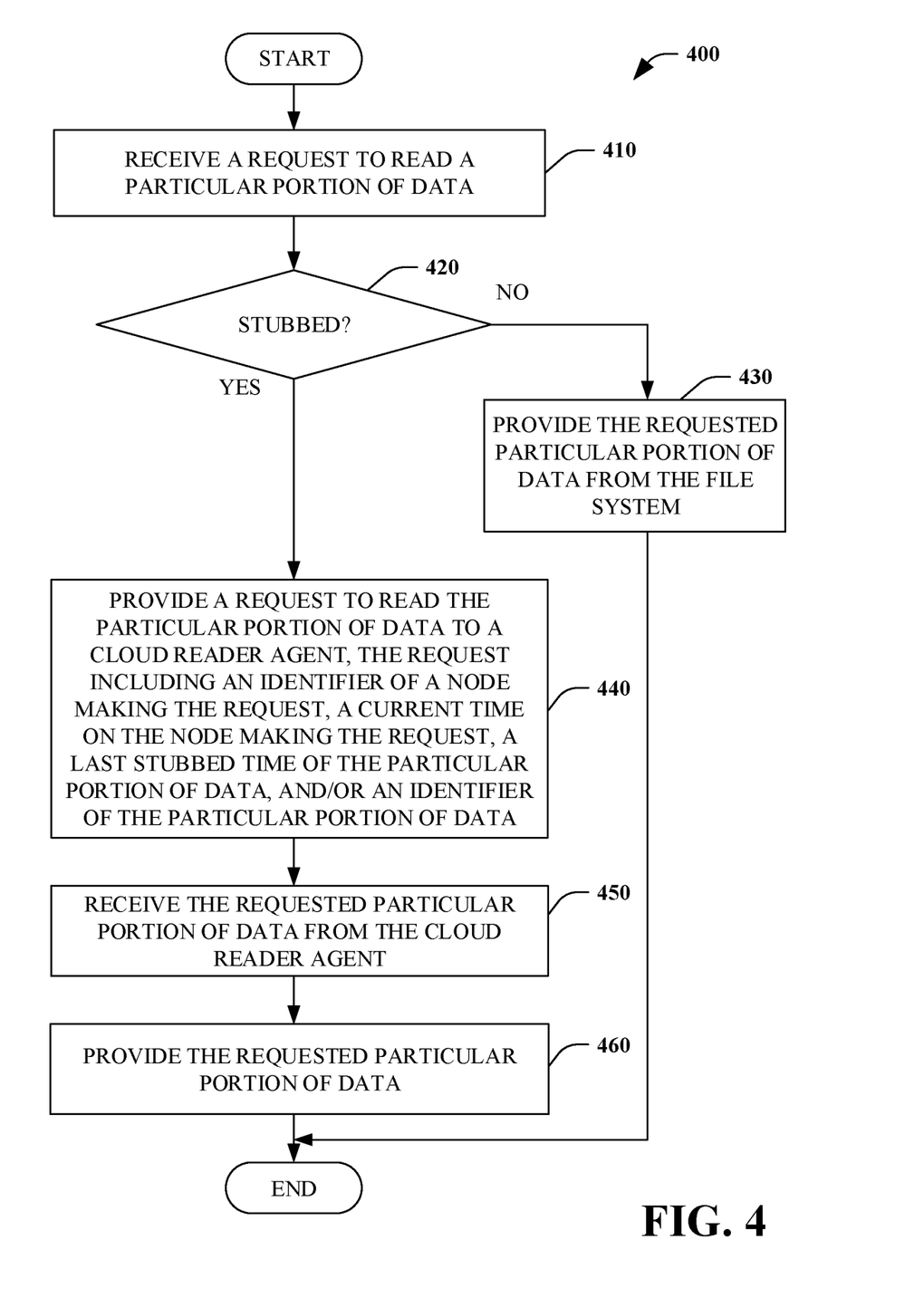
FIG. 4 is a flow chart of a method of responding to a client read request.

Turning to FIG. 4, a method of responding to a client read request 400 is illustrated. In some embodiments, the method 400 is performed by the file system 108.

At 410, a request to read a particular portion of data (e.g., blob, file) is received, for example, from a client. At 420, a determination is made as to whether or not the requested particular portion of data (e.g., chunk, blob, file) has been stubbed. If the determination at 420 is NO, at 430, the requested particular portion of data is provided (e.g., to the client) from the file system, and, no further processing occurs.

If the determination at 420 is YES, at 440, a request to read the particular portion of data is provided to a cloud reader agent (e.g., cloud reader component 124). The request includes an identifier of a node making the request, a current time on the node making the request, a last stubbed time of the particular portion of data, and/or an identifier of the particular portion of data (e.g., file name, blob name).

At 450, the requested particular portion of data is received from the cloud reader agent. At 460, the requested particular portion of data is provided (e.g., to the client), and, no further processing occurs.

Figure 5:
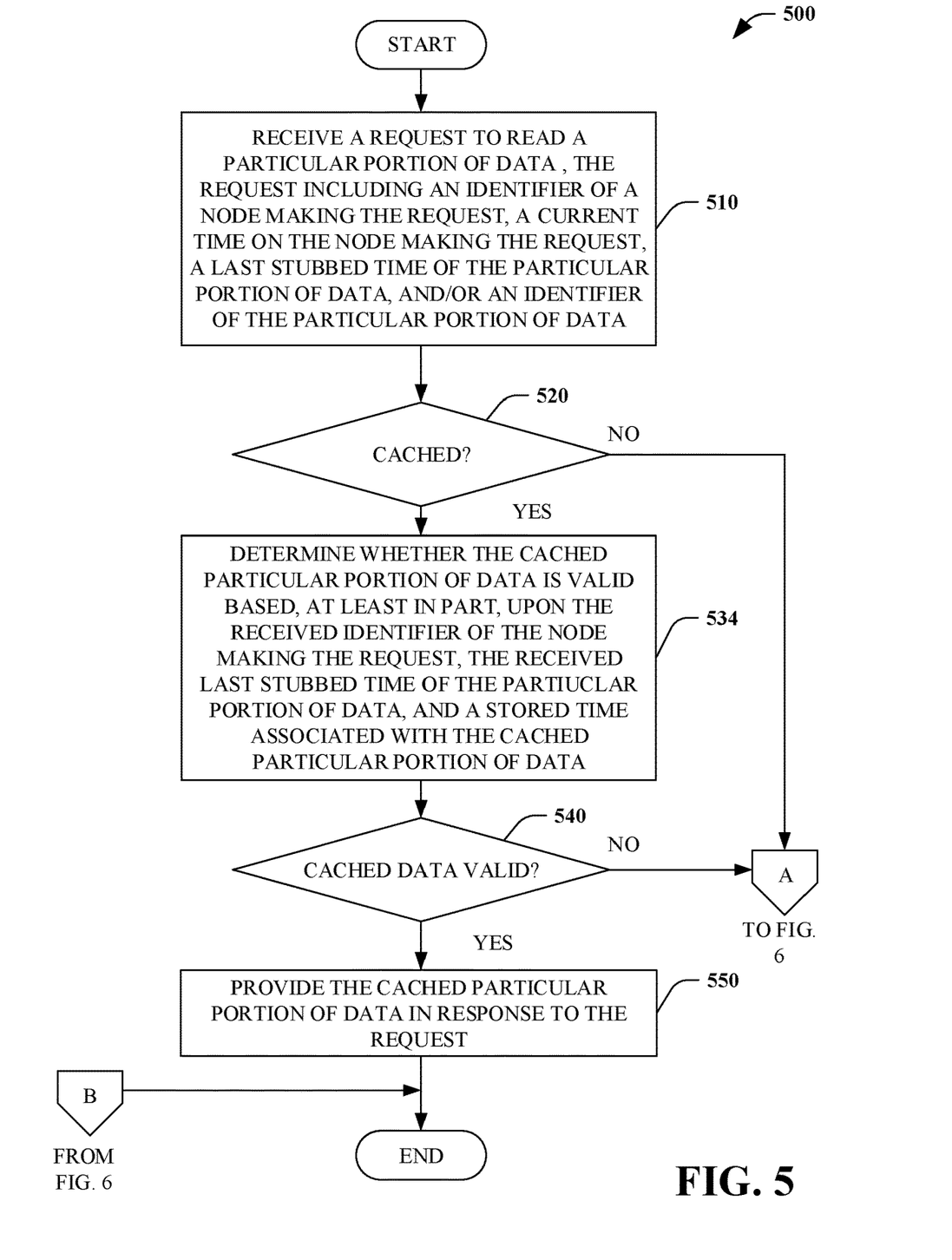
FIGS. 5 and 6 are flow charts of a method of performing a clustered coherent cloud read cache without coherency messaging.
Figure 6:
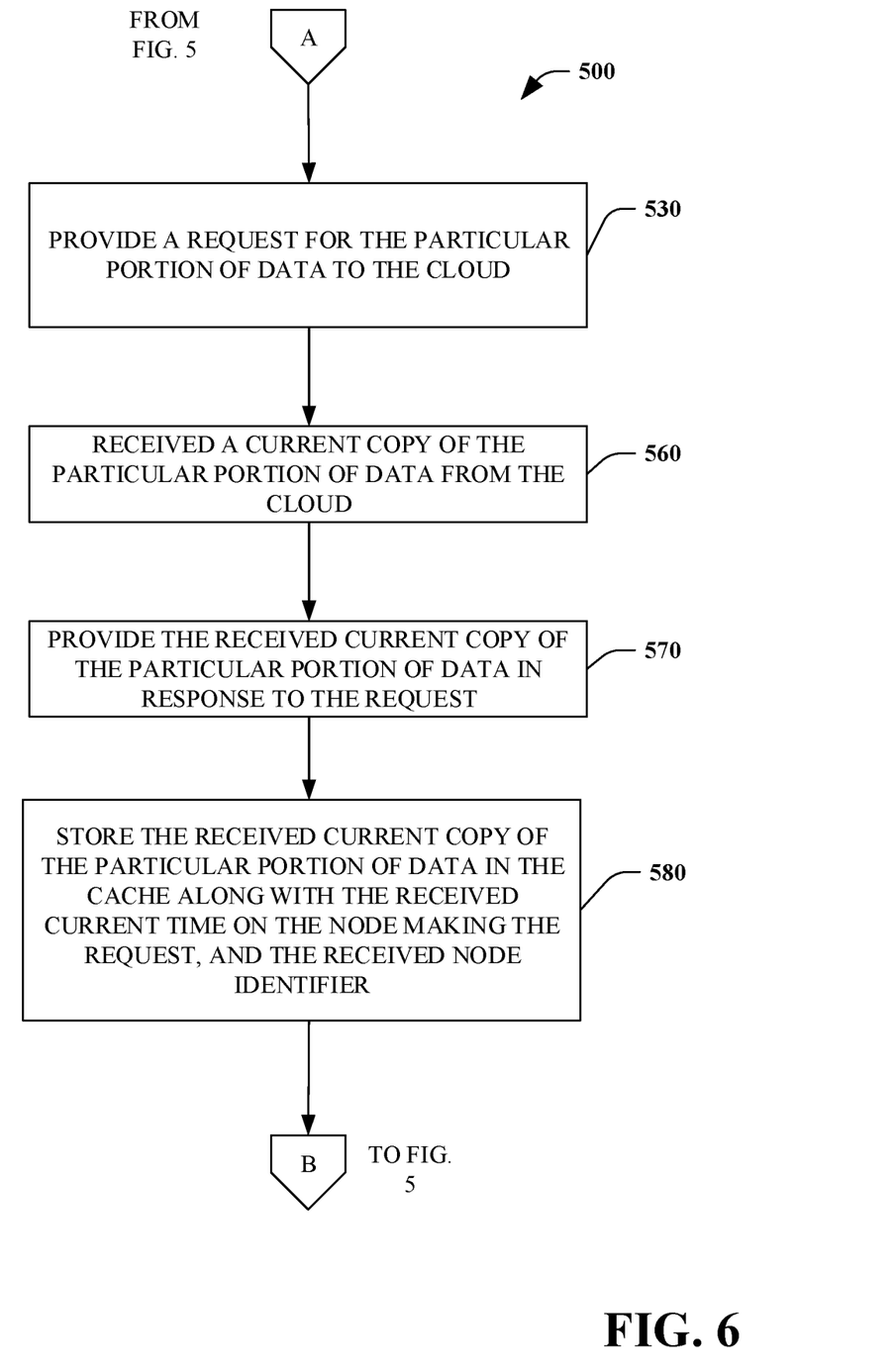

Next, referring to FIGS. 5 and 6, a method of performing a clustered coherent cloud read cache without coherency messaging 500 is illustrated. In some embodiments, the method 500 is performed by the cloud reader component 124.

At 510, a request for a particular portion of data (e.g., file, blob) is received. The request includes an identifier of a node of the plurality of nodes making the request, a current time on the node making the request, a last stubbed time of the particular portion of data, and/or an identifier of the particular portion of data.

At 520, a determination is made as to whether the particular portion of data is stored in a cache of the cloud reader agent. If the determination at 520 is NO, processing continues at 530. If the determination at 520 is YES, at 534, the cached particular portion of data is determined is determined to be valid or not valid based, at least in part, upon the received identifier of the node making the request, the received last stubbed time of the particular portion of data, and, a stored time associated with the cached particular portion of data. In some embodiments, the cached data is valid only if the cached data was read for the same node as making the current request, and, the stored time associated with the cached particular portion of data is the same or later than the received last stubbed time of the particular portion of data. That is, the cache data was read in response to a request originating from the same node at the same time or later than the time the particular data was stubbed.

At 540, a determination is made as to whether the cached particular portion of data is valid. If the determination at 540 is YES, at 550, the cached particular portion of data is provided in response to the request, and, no further processing occurs.

If the determination at 540 is NO, at 530, a request for the particular portion of data is provided to the cloud. In some embodiments, the cloud reader agent requests additional data which the cloud reader agent anticipates the client is likely to request. At 560, a current copy of the particular portion of data is received from the cloud. At 570, the received current copy of the particular portion of data is provided in response to the request. At 580, the received current copy of the particular portion of data is stored in the cache along with the received current time on the node making the request and the received node identifier. In some embodiments, the cloud reader agent store the additional data which the cloud reader agent anticipated the client is likely to request is also stored in the cache with the received current time on the node making the request and the received node identifier.

Figure 7:
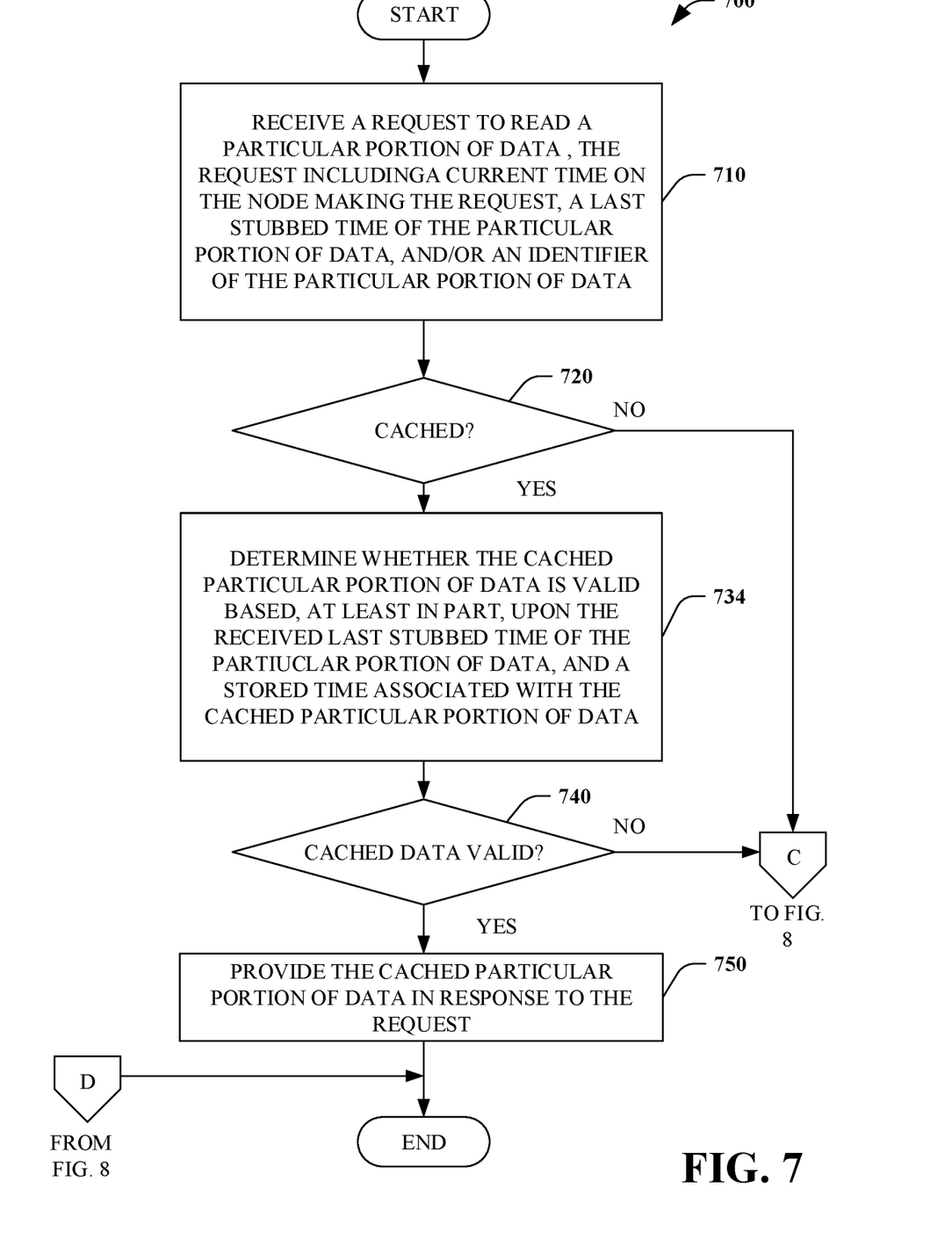
FIGS. 7 and 8 are flow charts of a method of performing a clustered coherent cloud read cache without coherency messaging.
Figure 8:
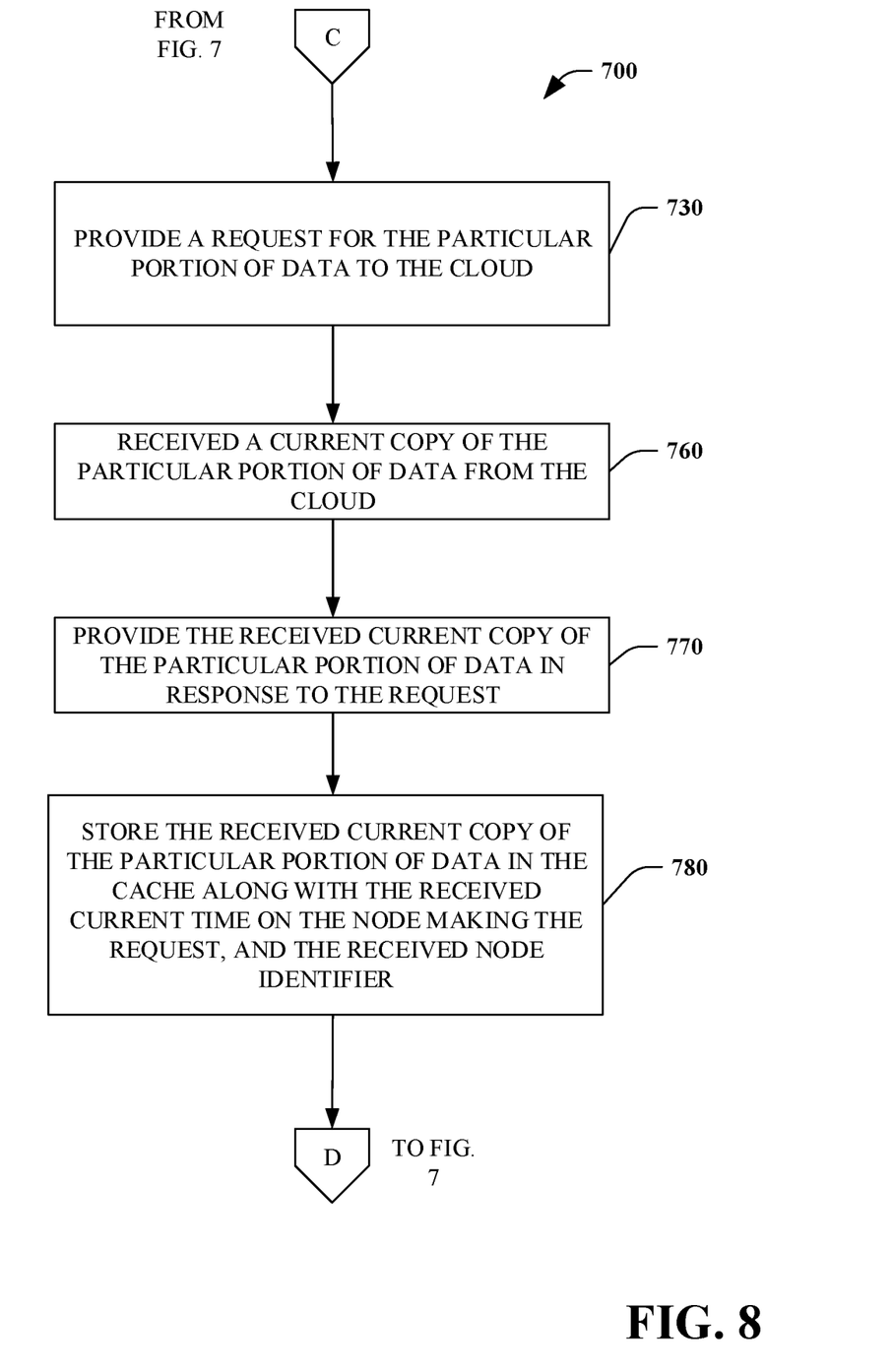

Next, turning to FIGS. 7 and 8, a method of performing a clustered coherent cloud read cache without coherency messaging 700 is illustrated. In some embodiments, the method 700 is performed by the cloud reader component 124.

At 710, a request for a particular portion of data (e.g., file, blob) is received. The request includes a current time on the node making the request, a last stubbed time of the particular portion of data, and/or an identifier of the particular portion of data.

At 720, a determination is made as to whether the particular portion of data is stored in a cache of the cloud reader agent. If the determination at 720 is NO, processing continues at 730. If the determination at 720 is YES, at 734, the cached particular portion of data is determined is determined to be valid or invalid based, at least in part, upon the received last stubbed time of the particular portion of data, and, a stored time associated with the cached particular portion of data. A predefined clock skew threshold (e.g., two minutes) can further be employed to account for clock skew between nodes. For example, if the stored time associated with the cached particular portion of data is the same or later than the sum of the received last stubbed time of the particular portion of data and the predefined clock skew threshold.

At 740, a determination is made as to whether the cached particular portion of data is valid. If the determination at 740 is YES, at 750, the cached particular portion of data is provided in response to the request, and, no further processing occurs.

If the determination at 740 is NO, at 730, a request for the particular portion of data is provided to the cloud. At 760, a current copy of the particular portion of data is received from the cloud. At 770, the received current copy of the particular portion of data is provided in response to the request. At 780, the received current copy of the particular portion of data is stored in the cache along with the received current time on the node making the request.

Described herein is a coherent read cache system, comprising: a computer comprising a processor and a memory having computer-executable instructions stored thereupon which, when executed by the processor, cause the computer to: at a cloud reader agent: receive a request for a particular portion of data from a client, the request comprising an identifier of a node of a plurality of nodes making the request, a current time on the node making the request, a last stubbed time of the particular portion of data, and an identifier of the particular portion of data; when the particular portion of data is stored in a cache of the cloud reader agent, determine whether the cached particular portion of data is valid based, at least in part, upon the received identifier of the node making the request, the received last stubbed time of the particular portion of data, and, a stored time associated with the cached particular portion of data; when it is determined that the cached particular portion of data is valid, provide the cached data in response to the request; when it is determined that the cached particular portion of data is not valid: request a current copy of the particular portion of data; receive the current copy of the particular portion of data; and, provide the received current copy of the particular portion of data in response to the request from the client.

The system can include the memory having further computer-executable instructions stored thereupon which, when executed by the processor, cause the computer to: store the received current copy of the particular portion of data, the received current time, and received node identifier in the cache of the cloud reader agent. The system can further include wherein determining whether the cached particular portion of data is valid is based only upon the received identifier of the node making the request, the received last stubbed time of the particular portion of data, and the stored time associated with the cached particular portion of data.

The system can further include wherein cache coherency messaging is not utilized to determine whether the cached particular portion of data is valid. The system can further include wherein the identifier of the particular portion of data comprises a file name. The system can further include wherein the particular portion of data comprises a file.

The system can further include wherein a particular portion of data comprises a portion of a file. The system can include the memory having further computer-executable instructions stored thereupon which, when executed by the processor, cause the computer to: when it is determined that the cached particular portion of data is not valid: request the current copy of the particular portion of data and additional data; receive the current copy of the particular portion of data and the additional data; provide the received current copy of the particular portion of data in response to the request from the client; and store the received current copy of the particular portion of data and the additional data, the received current time, and received node identifier in the cache of the cloud reader agent.

Described herein is a method of performing a clustered coherent cloud read cache without coherency messaging, comprising: receiving a request for a particular portion of data from a client, the request comprising an identifier of a node of the plurality of nodes making the request, a current time on the node making the request, a last stubbed time of the particular portion of data, and an identifier of the particular portion of data; when the particular portion of data is stored in a cache of the cloud reader agent, determining whether the cached particular portion of data is valid based, at least in part, upon the received identifier of the node making the request, the received last stubbed time of the particular portion of data, and, a stored time associated with the cached particular portion of data; when it is determined that the cached particular portion of data is valid, providing the cached data in response to the request; when it is determined that the cached particular portion of data is not valid: requesting a current copy of the particular portion of data; receiving the current copy of the particular portion of data; and, providing the received current copy of the particular portion of data in response to the request from the client.

The method can further include storing the received current copy of the particular portion of data, the received current time, and received node identifier in the cache of the cloud reader agent. The method can further include wherein determining whether the cached particular portion of data is valid is based only upon the received identifier of the node making the request, the received last stubbed time of the particular portion of data, and the stored time associated with the cached particular portion of data. The method can further include wherein cache coherency messaging is not utilized to determine whether the cached particular portion of data is valid.

The method can further include wherein the identifier of the particular portion of data comprises a file name. The method can further include wherein the particular portion of data comprises a file. The method can further include wherein a particular portion of data comprises a portion of a file.

The method can further include when it is determined that the cached particular portion of data is not valid: requesting the current copy of the particular portion of data and additional data; receiving the current copy of the particular portion of data and the additional data; providing the received current copy of the particular portion of data in response to the request from the client; and storing the received current copy of the particular portion of data and the additional data, the received current time, and received node identifier in the cache of the cloud reader agent.

Described herein is a computer storage media storing computer-readable instructions that when executed cause a computing device to: receive a request for a particular portion of data from a client, the request comprising a current time on a node making the request, a last stubbed time of the particular portion of data, and an identifier of the particular portion of data; when the particular portion of data is stored in a cache of the cloud reader agent, determine whether the cached particular portion of data is valid based, at least in part, upon the received last stubbed time of the particular portion of data, and, a stored time associated with the cached particular portion of data; when it is determined that the cached particular portion of data is valid, provide the cached data in response to the request; when it is determined that the cached particular portion of data is not valid: request a current copy of the particular portion of data; receive the current copy of the particular portion of data; and, provide the received current copy of the particular portion of data in response to the request from the client.

The computer storage media can store further computer-readable instructions that when executed cause a computing device to: store the received current copy of the particular portion of data, and the received current time in the cache of the cloud reader agent. The computer storage media can further include wherein determining whether the cached particular portion of data is valid is further based upon a predefined clock skew threshold.

The computer storage media can store further computer-readable instructions that when executed cause a computing device to: when it is determined that the cached particular portion of data is not valid: request the current copy of the particular portion of data and additional data; receive the current copy of the particular portion of data and the additional data; provide the received current copy of the particular portion of data in response to the request from the client; and store the received current copy of the particular portion of data and the additional data, the received current time in the cache of the cloud reader agent.

Figure 9:
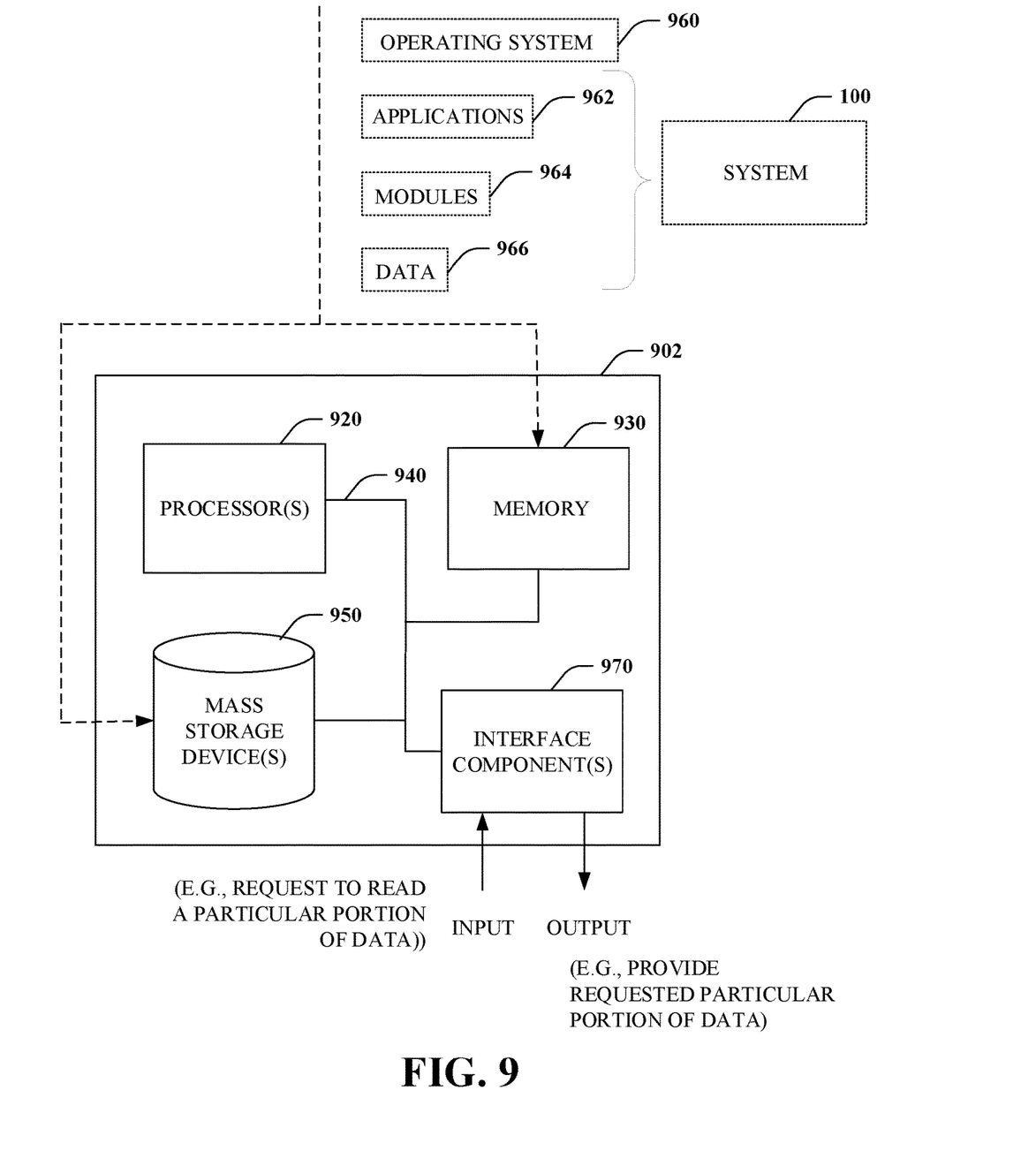
FIG. 9 is a functional block diagram that illustrates an exemplary computing system.

With reference to FIG. 9, illustrated is an example general-purpose computer or computing device 902 (e.g., mobile phone, desktop, laptop, tablet, watch, server, handheld, programmable consumer or industrial electronics, set-top box, game system, compute node, etc.). For instance, the computing device 902 may be used in a coherent read cache system 100.

The computer 902 includes one or more processor(s) 920, memory 930, system bus 940, mass storage device(s) 950, and one or more interface components 970. The system bus 940 communicatively couples at least the above system constituents. However, it is to be appreciated that in its simplest form the computer 902 can include one or more processors 920 coupled to memory 930 that execute various computer executable actions, instructions, and or components stored in memory 930. The instructions may be, for instance, instructions for implementing functionality described as being carried out by one or more components discussed above or instructions for implementing one or more of the methods described above.

The processor(s) 920 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 920 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 920 can be a graphics processor.

The computer 902 can include or otherwise interact with a variety of computer-readable media to facilitate control of the computer 902 to implement one or more aspects of the claimed subject matter. The computer-readable media can be any available media that can be accessed by the computer 902 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM), etc.), magnetic storage devices (e.g., hard disk, floppy disk, cassettes, tape, etc.), optical disks (e.g., compact disk (CD), digital versatile disk (DVD), etc.), and solid state devices (e.g., solid state drive (SSD), flash memory drive (e.g., card, stick, key drive) etc.), or any other like mediums that store, as opposed to transmit or communicate, the desired information accessible by the computer 902. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 930 and mass storage device(s) 950 are examples of computer-readable storage media. Depending on the exact configuration and type of computing device, memory 930 may be volatile (e.g., RAM), non-volatile (e.g., ROM, flash memory, etc.) or some combination of the two. By way of example, the basic input/output system (BIOS), including basic routines to transfer information between elements within the computer 902, such as during start-up, can be stored in nonvolatile memory, while volatile memory can act as external cache memory to facilitate processing by the processor(s) 920, among other things.

Mass storage device(s) 950 includes removable/non-removable, volatile/non-volatile computer storage media for storage of large amounts of data relative to the memory 930. For example, mass storage device(s) 950 includes, but is not limited to, one or more devices such as a magnetic or optical disk drive, floppy disk drive, flash memory, solid-state drive, or memory stick.

Memory 930 and mass storage device(s) 950 can include, or have stored therein, operating system 960, one or more applications 962, one or more program modules 964, and data 966. The operating system 960 acts to control and allocate resources of the computer 902. Applications 962 include one or both of system and application software and can exploit management of resources by the operating system 960 through program modules 964 and data 966 stored in memory 930 and/or mass storage device (s) 950 to perform one or more actions. Accordingly, applications 962 can turn a general-purpose computer 902 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, system 100 or portions thereof, can be, or form part, of an application 962, and include one or more modules 964 and data 966 stored in memory and/or mass storage device(s) 950 whose functionality can be realized when executed by one or more processor(s) 920.

In some embodiments, the processor(s) 920 can correspond to a system on a chip (SOC) or like architecture including, or in other words integrating, both hardware and software on a single integrated circuit substrate. Here, the processor(s) 920 can include one or more processors as well as memory at least similar to processor(s) 920 and memory 930, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100 and/or associated functionality can be embedded within hardware in a SOC architecture.

The computer 902 also includes one or more interface components 970 that are communicatively coupled to the system bus 940 and facilitate interaction with the computer 902. By way of example, the interface component 970 can be a port (e.g., serial, parallel, PCMCIA, USB, FireWire, etc.) or an interface card (e.g., sound, video, etc.) or the like. In one example implementation, the interface component 970 can be embodied as a user input/output interface to enable a user to enter commands and information into the computer 902, for instance by way of one or more gestures or voice input, through one or more input devices (e.g., pointing device such as a mouse, trackball, stylus, touch pad, keyboard, microphone, joystick, game pad, satellite dish, scanner, camera, other computer, etc.). In another example implementation, the interface component 970 can be embodied as an output peripheral interface to supply output to displays (e.g., LCD, LED, plasma, etc.), speakers, printers, and/or other computers, among other things. Still further yet, the interface component 970 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system, comprising:
a processor and a memory having computer-executable instructions stored thereupon which, when executed by the processor, cause the system to:
at a cloud reader agent:
receive a request for a particular portion of data from a client, the request comprising a current time associated with the request, a last stubbed time of the particular portion of data indicating when the particular portion of data was replaced with a reference to the particular portion of data, and an identifier of the particular portion of data;
when the particular portion of data is stored in a cache of the cloud reader agent, perform a comparison of the last stubbed time to a stored time associated with the particular portion of data stored in the cache;
based at least on the comparison of the last stubbed time to the stored time, determine whether the particular portion of data stored in the cache is valid;
when the particular portion of data stored in the cache is determined to be valid, provide the particular portion of data from the cache in response to the request;
when the particular portion of data stored in the cache is not determined to be valid:
request a current copy of the particular portion of data from a cloud device;
receive the current copy of the particular portion of data from the cloud device; and
provide the current copy of the particular portion of data in response to the request from the client.

2. The system of claim 1, the memory having further computer-executable instructions stored thereupon which, when executed by the processor, cause the system to:
when the particular portion of data stored in the cache is not determined to be valid, store, in the cache, the current copy of the particular portion of data, the current time, and an identifier of a requesting node that provided the request.

3. The system of claim 2, wherein the request comprises the identifier of the requesting node, and whether the particular portion of data stored in the cache is valid is determined based only upon the identifier of the requesting node, the last stubbed time of the particular portion of data, and the stored time associated with the particular portion of data stored in the cache.

4. The system of claim 1, wherein cache coherency messaging is not utilized to determine whether the particular portion of data stored in the cache is valid.

5. The system of claim 1, wherein the identifier of the particular portion of data comprises a file name.

6. The system of claim 1, wherein the particular portion of data comprises a file.

7. The system of claim 1, wherein the particular portion of data comprises a portion of a file.

8. The system of claim 1, the memory having further computer-executable instructions stored thereupon which, when executed by the processor, cause the system to:
when the particular portion of data stored in the cache is not determined to be valid:
request additional data from the cloud device, wherein the additional data is anticipated to be requested at a later time by a requesting node that provides the request;
receive the additional data from the cloud device; and
store, in the cache, the current copy of the particular portion of data, the additional data, the current time, and an identifier of the requesting node.

9. A method, comprising:
receiving a request for a particular portion of data from a client, the request comprising a current time associated with the request, a last stubbed time of the particular portion of data indicating when the particular portion of data was replaced with a reference to the particular portion of data, and an identifier of the particular portion of data;
when the particular portion of data is stored in a cache of a cloud reader agent, performing a comparison of the last stubbed time to a stored time associated with the particular portion of data stored in the cache;
based at least on the comparison of the last stubbed time to the stored time, determining whether the particular portion of data stored in the cache is valid;
when the particular portion of data stored in the cache is determined to be valid, providing the particular portion of data from the cache in response to the request;
when the particular portion of data stored in the cache is not determined to be valid:
requesting a current copy of the particular portion of data from cloud-based storage;
receiving the current copy of the particular portion of data from the cloud-based storage; and
providing the current copy of the particular portion of data in response to the request from the client.

10. The method of claim 9, further comprising:
when the particular portion of data stored in the cache is not determined to be valid, storing, in the cache, the current copy of the particular portion of data, the current time, and an identifier of a requesting node that provides the request.

11. The method of claim 9, wherein the request comprises an identifier of a requesting node making the request, and the determining whether the particular portion of data stored in the cache is valid is based only upon the identifier of the requesting node, the last stubbed time of the particular portion of data, and the stored time associated with the particular portion of data stored in the cache.

12. The method of claim 9, wherein cache coherency messaging is not utilized to determine whether the particular portion of data stored in the cache is valid.

13. The method of claim 9, wherein the identifier of the particular portion of data comprises a file name.

14. The method of claim 9, wherein the particular portion of data comprises a file.

15. The method of claim 9, wherein the particular portion of data comprises a portion of a file.

16. The method of claim 9, further comprising:
the particular portion of data stored in the cache is not determined to be valid:
requesting additional data from the cloud-based storage based at least on anticipation that the additional data will be subsequently requested by a requesting node that requested the particular portion of data;
receiving the additional data from the cloud-based storage; and
storing, in the cache, the current copy of the particular portion of data, the additional data, the current time, and an identifier of the requesting node.

17. A computer storage media storing computer-readable instructions that, when executed, cause a computing device to:

receive a request for a particular portion of data from a client, the request comprising a current time associated with the request, a last stubbed time of the particular portion of data indicating when the particular portion of data was replaced with a reference to the particular portion of data, and an identifier of the particular portion of data;

when the particular portion of data is stored in a cache, perform a comparison of the last stubbed time to a stored time associated with the particular portion of data stored in the cache;

when the particular portion of data stored in the cache is determined to be valid, provide the particular portion of data from the cache in response to the request;

when the particular portion of data stored in the cache is not determined to be valid:
  request a current copy of the particular portion of data from a remote cloud resource;
  receive the current copy of the particular portion of data from the remote cloud resource; and
  provide the current copy of the particular portion of data in response to the request from the client.

18. The computer storage media of claim 17, wherein the request is received from a file system, and the last stubbed time indicates when the file system last replaced the particular portion of data on the file system with the reference.

19. The computer storage media of claim 17, wherein determining whether the particular portion of data stored in the cache is valid is further based upon a predefined clock skew threshold.

20. The computer storage media of claim 17, storing further computer-readable instructions that, when executed, cause the computing device to:
  when the particular portion of data stored in the cache is not determined to be valid:
    request additional data from the remote cloud resource based at least on a determination that the client is anticipated to request the additional data in the future;
    receive the additional data from the remote cloud resource; and
    store the current copy of the particular portion of data, the additional data, and the current time in the cache.

* * * * *